United States Patent [19]

Sjöholm et al.

[11] 4,130,053
[45] Dec. 19, 1978

[54] APPARATUS FOR CUTTING CHEESE CURD

[75] Inventors: Claes B. Sjöholm, Malmo; Karl J. G. Märtensson, Lund, both of Sweden

[73] Assignee: Alfa-Laval AB, Tumba, Sweden

[21] Appl. No.: 676,876

[22] Filed: Apr. 14, 1976

[30] Foreign Application Priority Data

Apr. 18, 1975 [SE] Sweden .............................. 75045047

[51] Int. Cl.² ..................... A23C 19/02; A23C 21/00
[52] U.S. Cl. ................................. 99/466; 318/470; 318/484; 241/101.6
[58] Field of Search ............... 99/452, 456, 458–463, 99/465–466; 259/9, 25, 45, 109, 110; 318/470, 484; 200/38 B, 38 BA, 30 R, 153 LB, 153 T; 74/55

[56] References Cited

U.S. PATENT DOCUMENTS

| | | | |
|---|---|---|---|
| 2,767,362 | 10/1956 | Beaubien | 318/470 |
| 2,793,094 | 5/1957 | Bergson | 318/484 |
| 3,520,391 | 7/1970 | Graham | 318/470 |
| 3,733,702 | 5/1973 | Robertson | 99/462 |
| 3,829,594 | 8/1974 | Schweizer | 99/460 |
| 3,858,855 | 1/1975 | Hazen | 99/462 |

FOREIGN PATENT DOCUMENTS

| | | | |
|---|---|---|---|
| 442928 | 6/1924 | Fed. Rep. of Germany | 259/45 |
| 1255470 | 1/1961 | France | 99/459 |
| 442928 | 6/1924 | Fed. Rep. of Germany | 259/45 |
| 123952 | 2/1949 | Sweden | 99/466 |

*Primary Examiner*—Harvey C. Hornsby
*Assistant Examiner*—Robert Pous
*Attorney, Agent, or Firm*—Cyrus S. Hapgood

[57] ABSTRACT

A curd-cutting tool is rotatable about an axis within an immobile curdling container, driving means being provided for rotating this tool in one direction around said axis to cut the cheese curd; and means are operatively connected to the driving means for causing interruptions in the rotation of the tool in said one direction during the cutting operation.

4 Claims, 6 Drawing Figures

APPARATUS FOR CUTTING CHEESE CURD

The present invention relates to apparatus for cutting cheese curd and which is of the type comprising an immobile curdling container, a cutting tool rotatable about an axis within the container, and driving means for rotating the cutting tool during the cutting operation in one direction about said axis.

When cheese curd has coagulated in a curdling container, after addition of rennet, for instance, it has long been the practice to cut the curd into pieces by means of tools which have been manually operated. At many places, manual cutting of cheese curd in this manner is still taking place, in spite of the fact that modern automatic apparatus is available both for cutting of cheese curd and subsequent stirring of the cheese grains obtained by the cutting.

One difficulty in connection with automatic cutting of cheese curd is the tendency for the cheese curd to be entrained by the cutting tool in its movement within the curdling container. An entrainment of this kind causes an uncontrolled and inefficient cutting of the cheese curd. There is already available on the market certain apparatus for cutting and subsequent stirring of cheese curd, by means of which this difficulty is reduced; but such apparatus is very complicated and expensive, and an installation thereof for relatively small curdling containers does not pay.

One previously known apparatus of this kind is disclosed in French patent No. 1,459,566. A characterizing feature of this apparatus is that it comprises two cutting and stirring tools which are rotatable by driving means both about the axis of the curdling container and, simultaneously, about separate axes at some distance from said axis of the curdling container. By rotation of the cutting and stirring tools in different directions around their respective axes, the problem of entrainment of the cheese curd during the cutting operation may be reduced.

In connection with relatively small curdling containers, for which an apparatus of this kind does not pay (as previously mentioned), the art has long sought a simple solution of the problem of entrainment of the cheese curd during the cutting operation. One solution of the problem is disclosed in the Danish published patent application 130,324. According to this solution, a unit having a number of cutting members and a vertical wall is immersed in a cylindrical curdling container, after which the cutting members are rotated about the axis of the curdling container while the vertical wall is kept stationary for preventing entrainment of the cheese curd during the rotation. This unit, after cutting of the cheese curd is completed, is removed from the curdling container and replaced by a stirring tool.

The present invention provides a simple and inexpensive solution of the above-mentioned problem. According to the invention, an apparatus of the initially described kind is supplemented by means operatively connected to said driving means and arranged to cause interruptions of said rotation in one direction of the cutting tool during the cutting operation.

The invention enables cutting of the cheese curd by the use of only one cutting tool within the curdling container. Further, a single tool constructed for both cutting and subsequent stirring of the cheese curd may be used.

According to the invention, said means operatively connected to the driving means may be arranged, if desired, to start and stop the driving of the cutting tool at predetermined time intervals during the cutting operation. However, in a preferred embodiment of the invention, said means comprise a number of members arranged to sense when the cutting tool is situated at predetermined positions in the container, and then to cause interruptions in the cutting tool driving. After the cutting operation has been going on for a while, the released whey has risen to the surface of the cheese mass, whereas the cheese grains, being heavier than the whey, remain in the lower part of the curdling container. Consequently, if the cutting tool is rotatable around a horizontal axis, it is possible to reduce the number of interruptions of the driving to an absolute minimum. Interruptions in the driving may then be made, for instance, only when the cutting tool is situated in the lower part of the container.

The invention may be put into practice in different ways. For example the cutting tool may be first caused to move for cutting of the cheese curd and subsequently disconnected from the driving means, so that the cheese curd thus put into motion may stop by itself before the cutting tool is again started for cutting. According to another alternative, the cutting tool is first started for cutting of the cheese curd and subsequently stopped and kept stationary, so that it causes retardation of the cheese curd previously put into motion. According to a third alternative, the cutting tool is first started to move around its axis of rotation in the direction opposite that which would be most effective for cutting, so that the cheese curd is entrained; and when the cheese curd has thus been put into motion, the cutting tool is stopped and kept still for a time while the cheese curd continues its movement or rotation and thereby is automatically cut by the stationary cutting tool.

In a preferred embodiment of the invention, intended for the two last mentioned alternatives, the driving means are arranged to retard continued rotation of the cutting tool when the driving thereof has stopped; and the cutting tool comprises swingable members arranged to act like check valves for passage of cheese curd through the cutting tool. Thus, upon rotation of the cutting tool in one direction relative to the chesse curd, the swingable members will take positions in which they permit passage of cheese curd through the cutting tool, but upon rotation of the cutting tool in the opposite direction relative to the cheese curd, these members will take positions in which they oppose passage of the cheese curd through the cutting tool. The expression "rotation of the cutting tool . . . relative to the cheese curd" as here used intended to include both the case where the cutting tool is moving but the cheese curd is substantially still and the case where the cheese curd is moving but the cutting tool is utilized to retard movement of the cheese curd.

The invention is described further below with reference to the accompanying drawings in which FIG. 1 is an axial sectional view of a curdling container;

Figure 1:
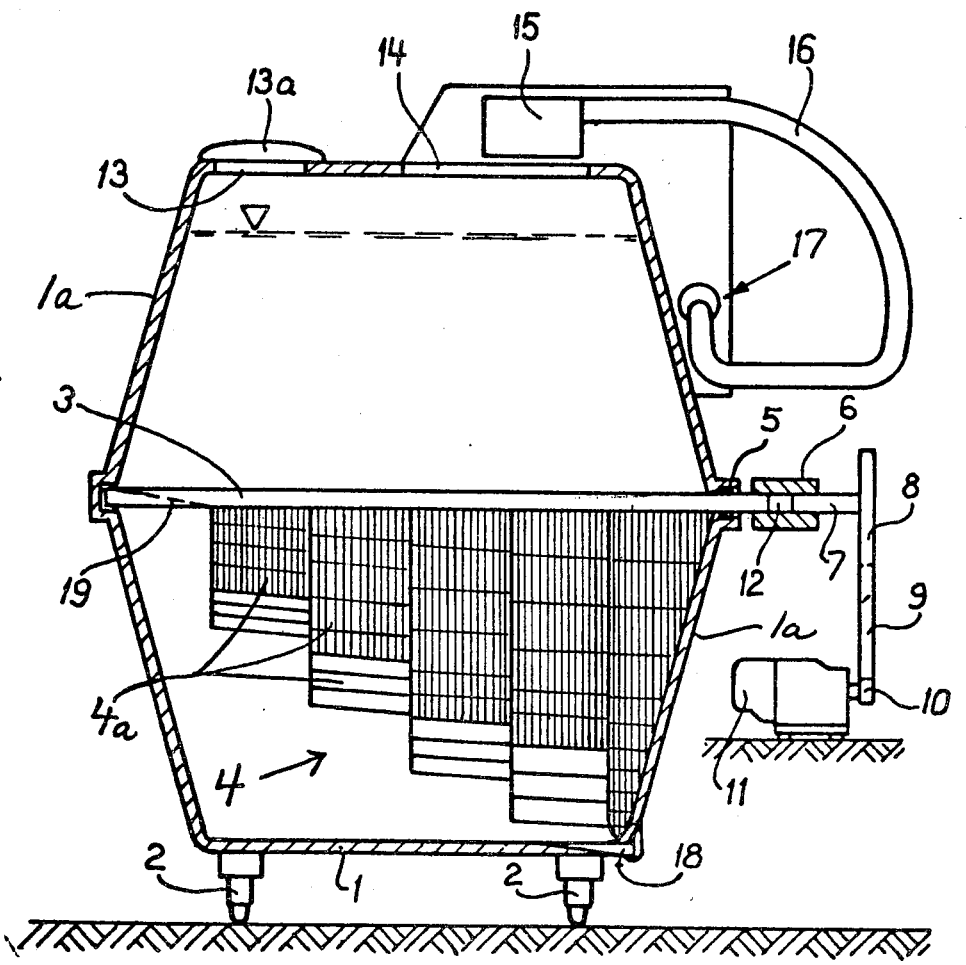
Figure 2:
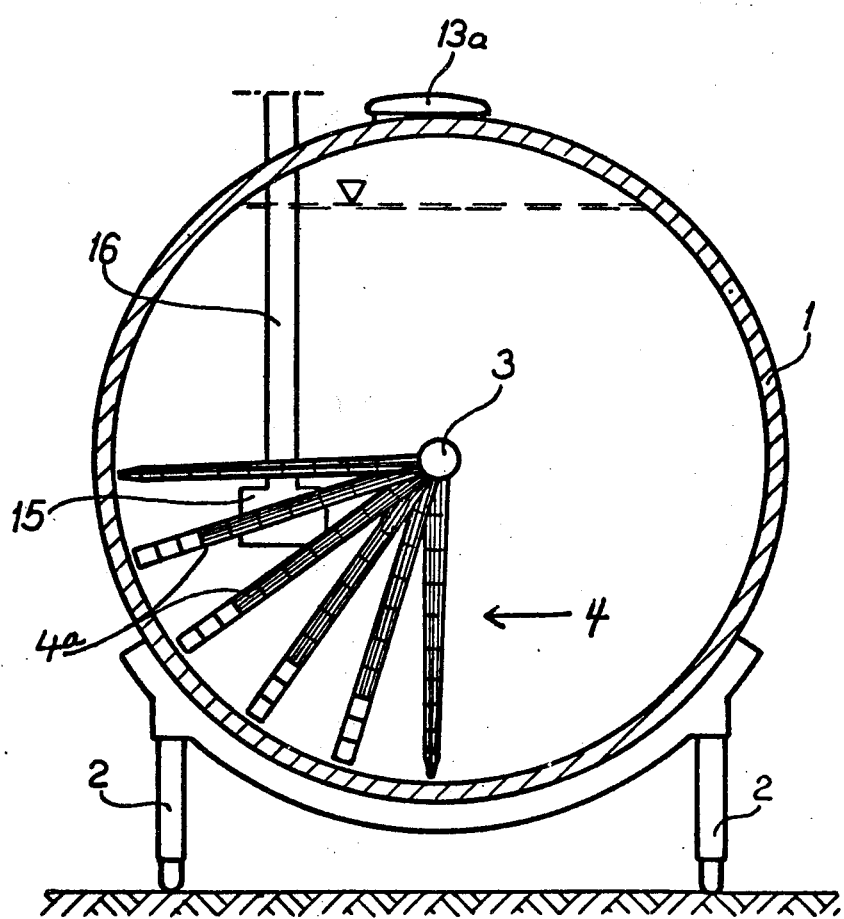
FIG. 2 is a cross-sectional view of the container, seen from the left in FIG. 1.

In FIGS. 1 and 2 there is shown a cylindrical curdling container 1 supported by a number of legs 2, so that the container axis extends substantially horizontally. A small inclination, about 2°, has been given to the container axis relative to a horizontal line, however, for reasons to be mentioned later. The end walls 1a of the container 1 are formed conically, and through one of these end walls a shaft 3 extends centrally into the container. This shaft, being journalled in the opposite end wall, supports a tool 4 for cutting and stirring of cheese curd in the curdling container. A seal 5 is provided between the shaft 3 and the wall through which the shaft 3 extends into the curdling container.

Outside the curdling container, the shaft 3 is connected by means of a coupling 6 to a short shaft 7, which supports a pulley 8. Through a belt 9, the pulley 8 is rotatably connected with another pulley 10 arranged to be driven by a motor 11. The motor 11 is reversible so that it can rotate the tool 4 about the axis of the curdling container 1 alternately in one direction and then the other. In the coupling 6 there is left a small interspace 12 between the shafts 3 and 7, so that when necessary the seal 5 can easily be replaced after removal of the coupling 6. For the sake of clarity, a supporting bearing for the shaft 7 has been omitted from the drawing.

The curdling container 1 in its upper part has a manhole 13 covered by a manhole cover 13a. A further opening 14 in the upper part of the container 1 is intended for immersion of a whey sieve 15 into the container 1. The whey sieve 15 is supported by a bent pipe 16 which at 17 is rotatably connected to the container 1. The whey sieve 15 is rotatable between the retracted position shown in FIG. 1 and the immersed position shown in FIG. 2. The curdling container 1 at its lowest part has an outlet 18. The surface level of the cheese curd within the container is shown by a triangle. The tool 4 is divided into several sections 4a which are situated side-by-side along the shaft 3, as can be seen from FIG. 1. In the illustrated embodiment, the tool consists of six sections 4a. The sections are connected with the shaft 3 in a way such that they form angles with each other, as can be seen from FIG. 2. In the illustrated embodiment, the sections are placed one after the other along the shaft 3 so that they extend outwards from the shaft like successive parts of a screw thread. The sections situated most remote from each other forms an angle of about 90° with each other.

Each of the tool sections also forms an angle with the shaft 3, as is illustrated by a dashed line 19 in FIG. 1, which is intended to show the section situated most to the left and concealed by the shaft 3.

Figures 3, 4:
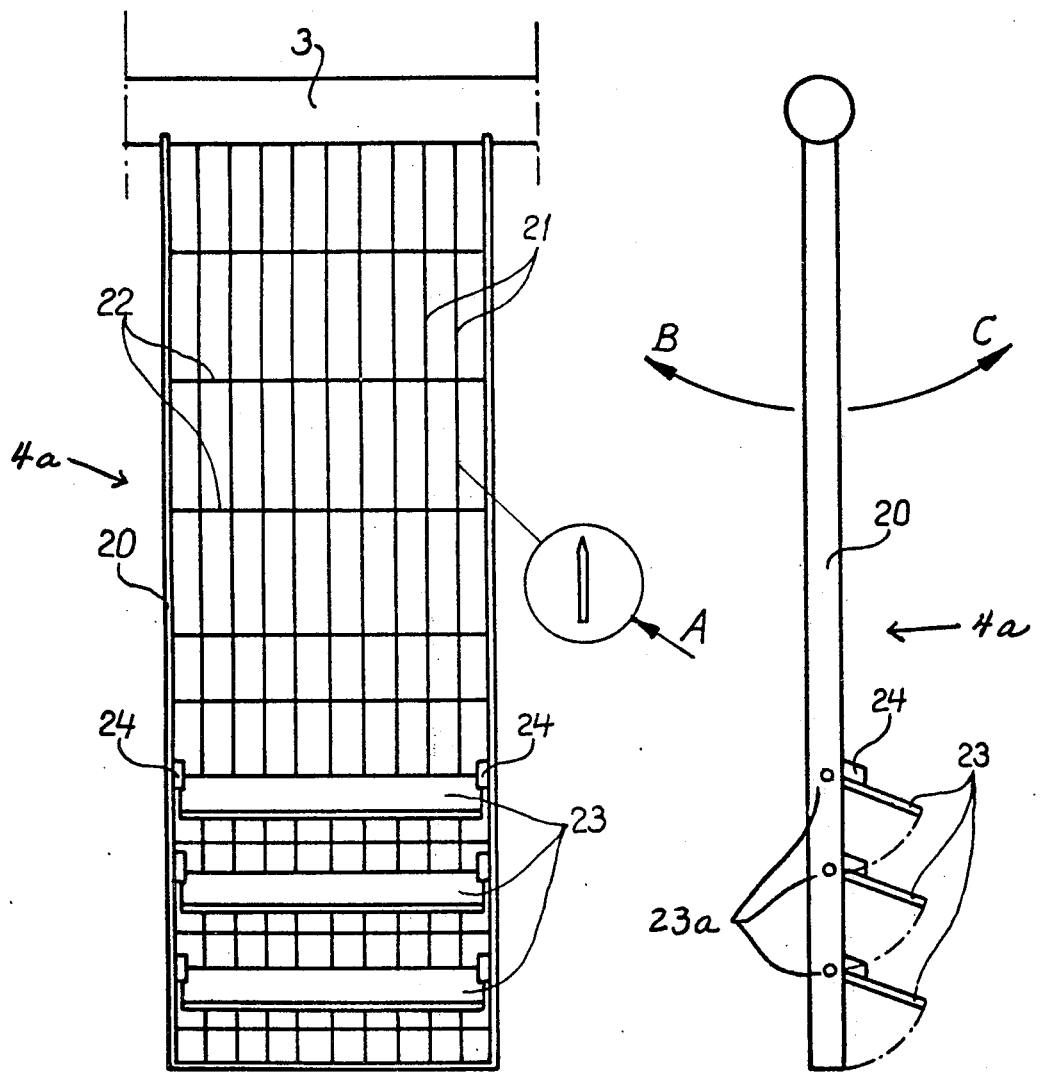
FIGS. 3 and 4 are detail views of part of a tool for cutting and stirring cheese curd.

In FIGS. 3 and 4 there is shown a tool section 4a in detail. This comprises a frame 20 connected to the shaft 3 and supporting several knives each having a cross-section as shown at A in FIG. 3. Some knives 21 extend substantially perpendicular to the shaft 3, whereas other knives 22 extend substantially parallel with the shaft 3. At its part remote from the shaft 3, the frame 20 also supports three flaps 23. These flaps are swingably connected with the frame 20 through shafts 23a substantially parallel with the shaft 3, as can be seen from FIG. 4. The knives 21 and 22 limit the swinging movement of the flaps 23 in one direction, whereas separate stops 24 limit the swinging movement of the flaps in the other direction. The flaps 23 are situated on the rear sides of the knives 21 and 22, which sides are not sharp. In FIG. 4 an arrow B shows the rotational direction of the tool section when cheese curd is to be cut, whereas an arrow C shows the rotational direction of the tool section when cheese curd is to be stirred.

Figure 5:
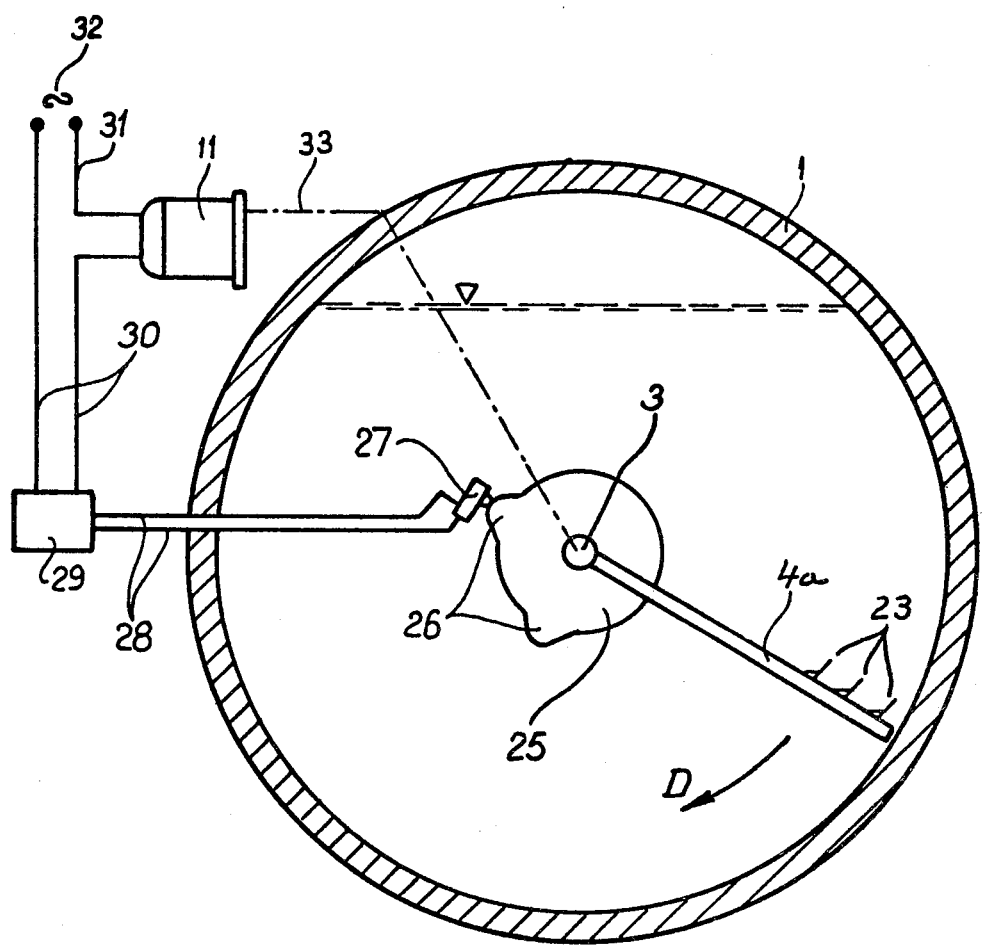
FIG. 5 is a cross-sectional view through the curdling container, seen from the left in FIG. 1, showing schematically certain means arranged to cooperate during the cutting of cheese curd.

In FIG. 5 there is shown schematically a cross-section of the curdling container 1 and one of the sections 4a of the tool 4 according to FIGS. 3 and 4. As can be seen from FIG. 5, the shaft 3 supports a cam member 25 connected therewith and having two cams 26. Adjacent the cam member 25 is a micro-switch 27 which, through a double connection 28, is connected with a control unit 29 containing a delay mechanism. The control unit 29 in turn is connected through connections 30 to the motor 11 (FIG. 1) and also to a current source 32. (The control unit 29 also is connected to a separate current supply not shown in FIG. 5.) The motor 11 is connected through a connection 31 to the current supply 32. A dash-dot line 33 in FIG. 5 represents the driving connection between the motor 11 and the shaft 3. The micro-switch 27 and the control unit 29 are arranged, during rotation of the tool 4 in the direction shown by arrow D in FIG. 5, to stop the rotation during short periods of time when the tool 4 is at predetermined positions within the curdling container 1. The cam member 25 and the micro-switch 27 may be mounted either within or outside the curdling container 1.

In the operation of the illustrated apparatus, when milk and additives situated within the curdling container 1 have coagulated, the motor 11 is started for the cutting of the cheese curd. The tool 4 and the cam member 25 are then caused to rotate in the direction of the arrow D in FIG. 5. When the first cam 26 is brought into contact with the micro-switch 27, the motor 11 will automatically be stopped. After a short period of time, the length of which is determined by the delay mechanism in the control unit 29, the motor 11 is again started, the tool then being rotated in the same direction as before, until the next cam 26 is brought into contact with the micro-switch 27. One further short stop in the rotation of the tool then takes place automatically. Any desired number of cams may be carried by the cam member 25.

While being rotated, the tool cuts thin annular pieces of the cheese curd, which pieces are coaxial with the curdling container. Each time the tool is put into motion, the edges of the knives 21 and 22 thus pass through the cheese curd, the latter then being entrained (to a larger or smaller degree) by the movement of the tool. The flaps 23 then are forced to take the positions shown in FIG. 5. When the tool is stopped and is kept still by the motor 11, the cheese curd which was put into motion by the previous movement of the tool will force the flaps 23 to swing to their opposite end positions, in which they lie substantially flat against the adjacent knives 21 and 22 and thus block a part of the interspaces between the knives. Due to the surfaces of the flaps 23 being turned to their blocking positions and being somewhat inclined relative to the shaft 3 (see numeral 19 in FIG. 1), the cheese curd will acquire a small movement component in the axial direction of the container, whereby parts of the cheese curd rings which were cut by the tool knives will be axially displaced and will thus be cut to pieces by the knives during the next rotational movement of the tool.

When the cheese curd, after a number or revolutions of the tool 4, has been cut into small pieces, the direction of rotation of the tool is reversed. Manually or automatically the micro-switch 27 and the control unit 29 are simultaneously disconnected, so that the rotation can take place without interruption. During the resulting stirring of the cheese curd, more and more whey will gradually be released from the cut cheese curd. The cheese curd having greater density than the whey will at the end of the stirring operation take up only between 10 and 20 per-cent of the original volume of the cheese curd. During the stirring operation, the flaps 23 of the tool will (at least upon movements upwardly in the curdling container) abut against the rear sides of the knives 21 and thus partly block the interspaces between the knives. Cheese curd situated in the way of the flaps 23 will thus be elevated somewhat by the flaps and will gradually slide off the latter partly in the axial direction (away from the bottom outlet 18), depending on the inclination of the flaps relative to the drive shaft 3 of the tool.

After a certain time of agitation of the cheese curd, the motor 11 is stopped and then the whey sieve 15 is swung down into the curdling container to the position shown in FIG. 2. By means of a pump (not shown), a part of the whey is then pumped out of the curdling container, after which hot water is supplied to the curdling tank. The cheese curds are then further stirred a period of time and are then discharged from the curdling container through the bottom outlet 18. The small inclination of the curdling container facilitates the discharge operation.

If desired, the tool 4 may be caused to perform a pendulum movement, during the discharge of whey, outside the sector of its normal angle of rotation where the whey sieve is situated. For this purpose, the drive shaft 3 of the tool may be provided with one further cam member (not shown) similar to the cam member 25 in FIG. 5, and means for reversing the direction of rotation of the motor 11 at certain sensed positions of the tool. As can be seen from FIG. 2, it is possible, by having the tool 4 divided into sections which form an angle with each other, to immerse the whey sieve, during the whey discharge, below the level of the driving shaft 3 without causing the sieve to prevent agitation of the cheese curd at a higher level in another part of the curdling container (i.e., in this case at the opposite end of the curdling container).

Another advantage of having the tool 4 divided into sections 4a forming angles with each other is that the load to which the motor 11 must be subjected, in connection with agitation of the cut cheese curd, can be evenly distributed during a large part of the rotation movement of the tool; in other words, the flaps 23 of the tool need not elevate cheese curd simultaneously during their upward movements.

Figure 6:
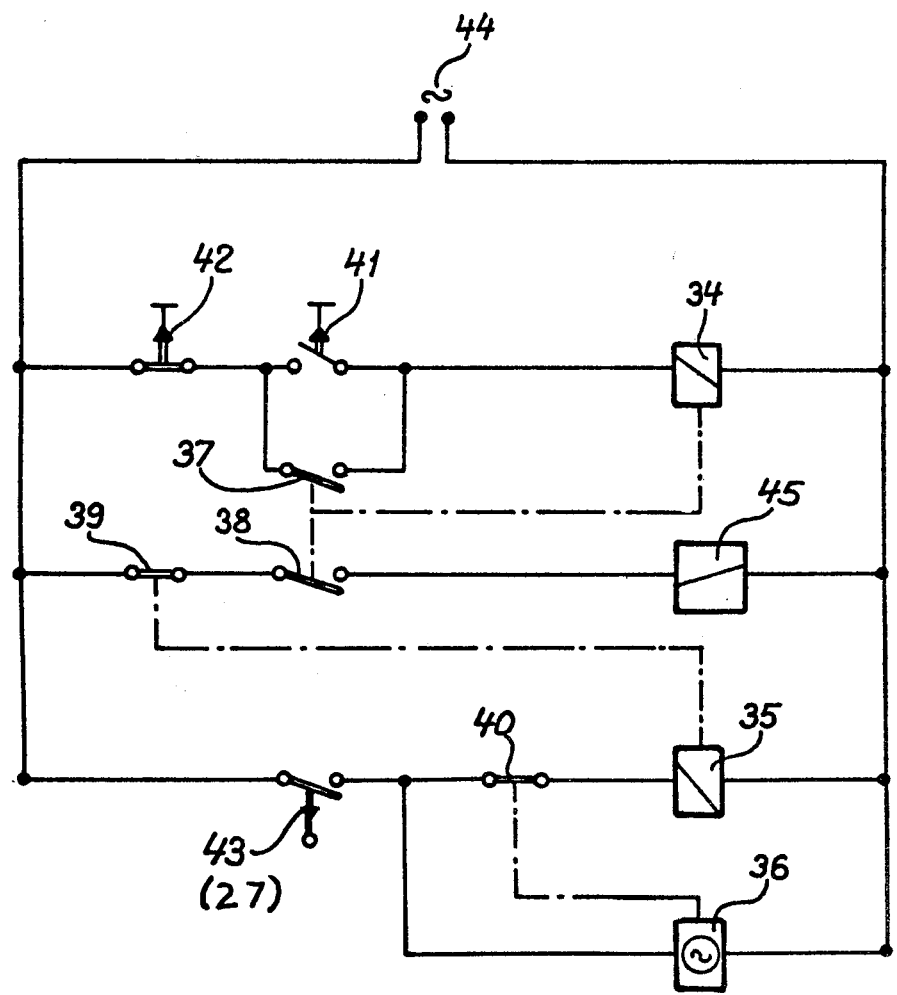
FIG. 6 is an electric wiring diagram.

In FIG. 6 is shown a wiring diagram of the control unit 29 (FIG. 5). Numerals 34 and 35 designate conventional relays, and numerals 36 designates a so-called delay relay. Numerals 37–40 designate conventional spring-loaded switches which are arranged to be influenced by the relays 34–36 (through dotted connections), when the latter are connected to a current source. Numerals 41 and 42 designated manually operable switches, of which the switch 41 constitutes a starting button and the switch 42 a stop button. Numeral 43 designates a switch constituting the micro-switch 27 in FIG. 5. Numeral 44 designates a current source (not shown in FIG. 5). Numeral 45 designates a contact relay that is arranged, when it is connected to the current source 44, to close the circuit 30, 31 in which the motor 11 is included (FIG. 5).

When the motor 11 is to be started, the switch 41 is closed, whereby the relay 34 is connected to the current source 44 and causes closing of the switches 37 and 38. This causes the contact relay 45 to be connected to the current source 44 and to close the motor circuit 30, 31 so that the motor 11 is started.

When one of the cams 26 in FIG. 5 arrives opposite to the micro-switch 27, the switch 43 in FIG. 6 is closed. Relay 35 is thus activated and opens the switch 39, so that the connection between the contact relay 45 and the current source 44 is cut off. The motor circuit 30, 31 is thereby opened and the motor 11 stops.

At the same moment as the switch 43 is closed by a cam 26 (FIG. 5), the delay relay 36 is actuated. A predetermined period of time after this moment, the delay relay 36 influences the switch 40 so that the latter is opened. The relay 35 thus loses its connection with the current source 44, whereby the switch 39 is reclosed. The contact relay 45 is thus again connected to the current source 44 and closes the motor circuit 30, 31. The motor 11 is then started and will drive the cam member 25 until the next cam 26 influences the micro-switch 27.

The switches 37 and 38 are kept closed by the relay 34, until the switch 42 is influenced.

Initially during a cutting operation by means of an apparatus of the above-described kind (i.e., before any substantial amount of whey has been released from the cheese curd), it may occasionally prove possible to rotate the tool 4 one or two revolutions about its axis in the container 1 without substantial entrainment of the cheese curd. In that case, the abovedescribed means for causing interruptions of the rotation of the tool need not be used during the first part of the cutting operation.

We claim:

1. Apparatus for cutting and stirring cheese curd, which comprises an immobile curdling container with a circular cross section and having a substantially horizontal axis, a cutting and stirring tool mounted within the container for rotation about said axis, driving means connected to said tool for rotating the same through a plurality of revolutions in one direction about said axis to effect a cutting operation, said tool including swingable members operable during a said cutting operation as check valves for passage of cheese curd through the tool, said swingable members being operable, in response to rotation of the tool in said one direction relative to the cheese curd, to take positions where said members permit passage of cheese curd through the tool, whereby the curd is cut, said members being operable, in response to rotation of the tool in the opposite direction relative to the cheese curd, to take positions where they oppose passage of curd through the tool, and a control system operatively connected to said driving means for causing interruptions in the rotation of the tool in said one direction during the cutting operation and for maintaining the tool stationary at each such interruption, the control system including control means for operating said driving means to rotate the tool through a plurality of revolutions in said opposite direction about said axis, without interruptions, to effect a stirring operation in which cut cheese curd is rotated around said axis.

2. The combination of claim 1, in which said control means include means for sensing when the cutting tool is in predetermined positions in the container and then causing said interruptions.

3. The combination of claim 1, in which said control means include a member provided with cams and rotatable by said driving means, a switch actuatable by said cams, and a control unit connected with said switch and with said driving means, said switch and control unit being operable to stop said driving means in response to actuation of the switch by a said cam and to restart the driving means after a predetermined period of time.

4. The combination of claim 1, in which said container is in the form of a cylinder having its axis substantially horizontal, the cutting tool extending substantially from said axis to the surrounding wall of the cylinder and being rotatable around said cylinder axis, said swingable members being located only at the part of the cutting tool situated nearest the surrounding wall of the cylinder.

* * * * *